INVENTOR
John W. Shipp

BY
ATTORNEYS

INVENTOR
John W. Shipp

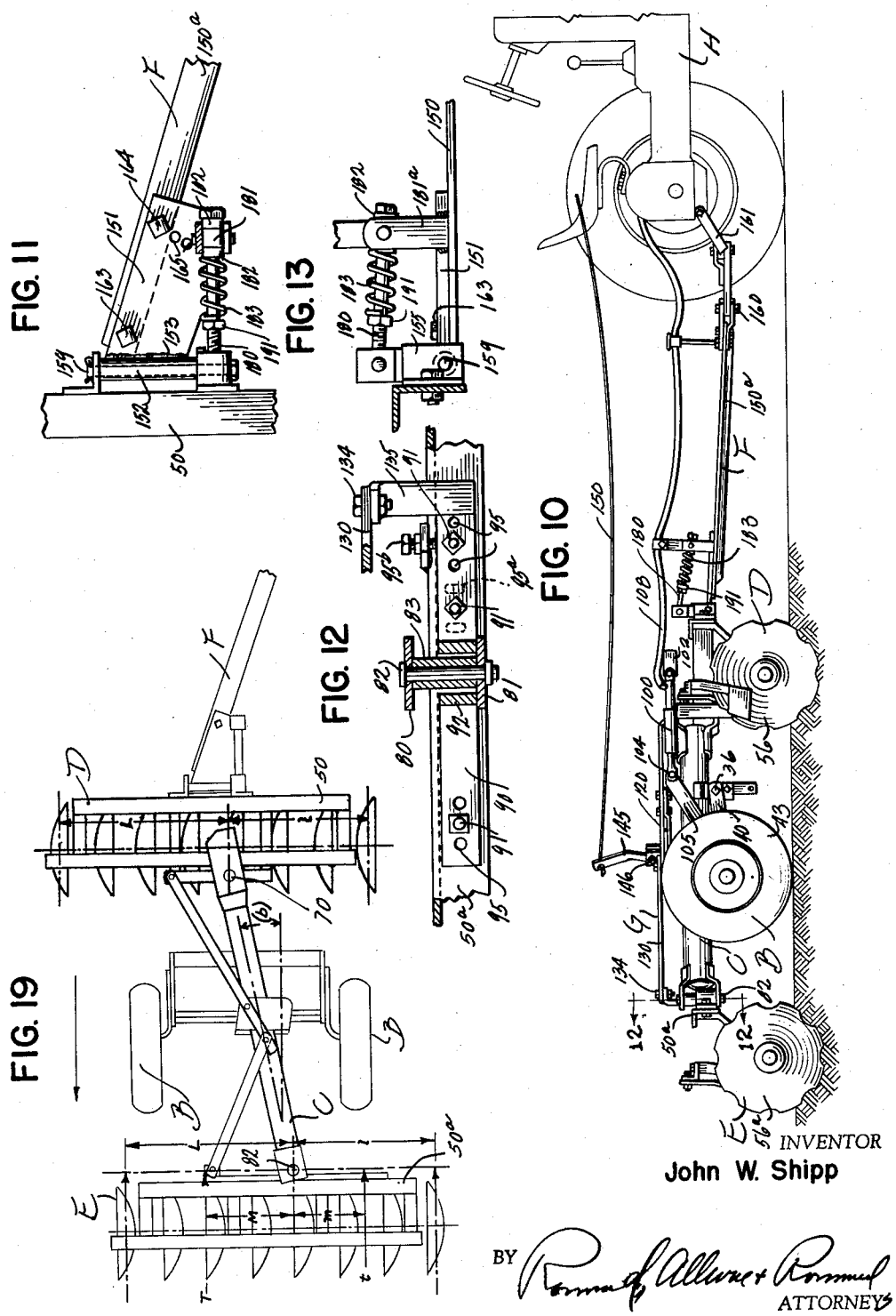

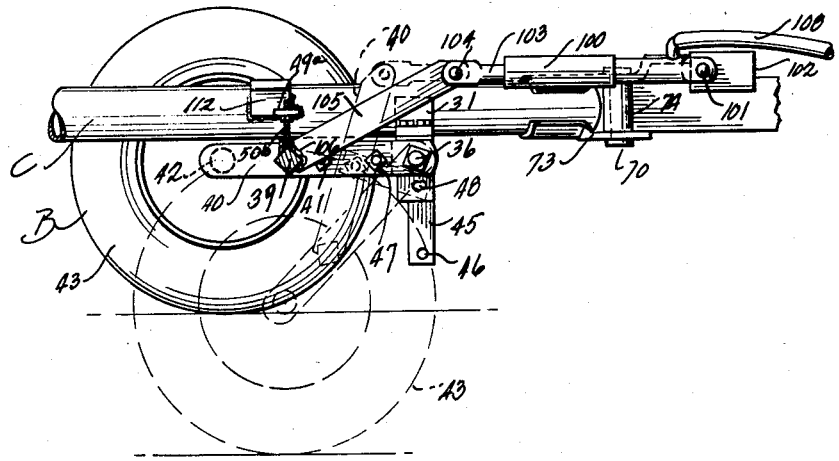
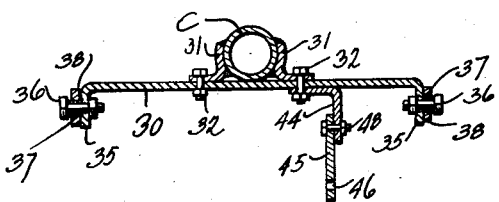
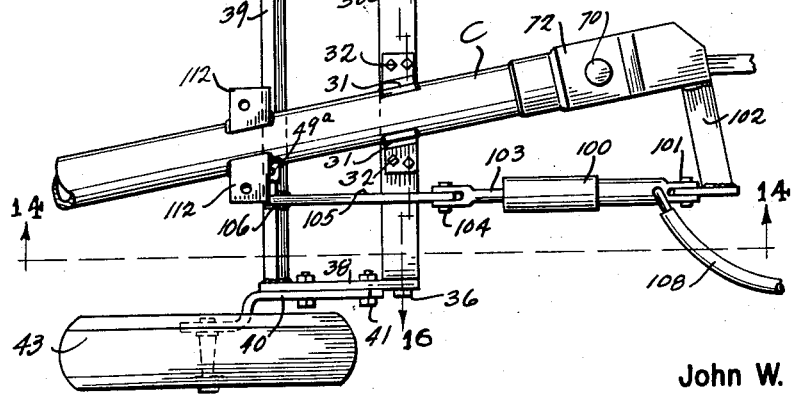

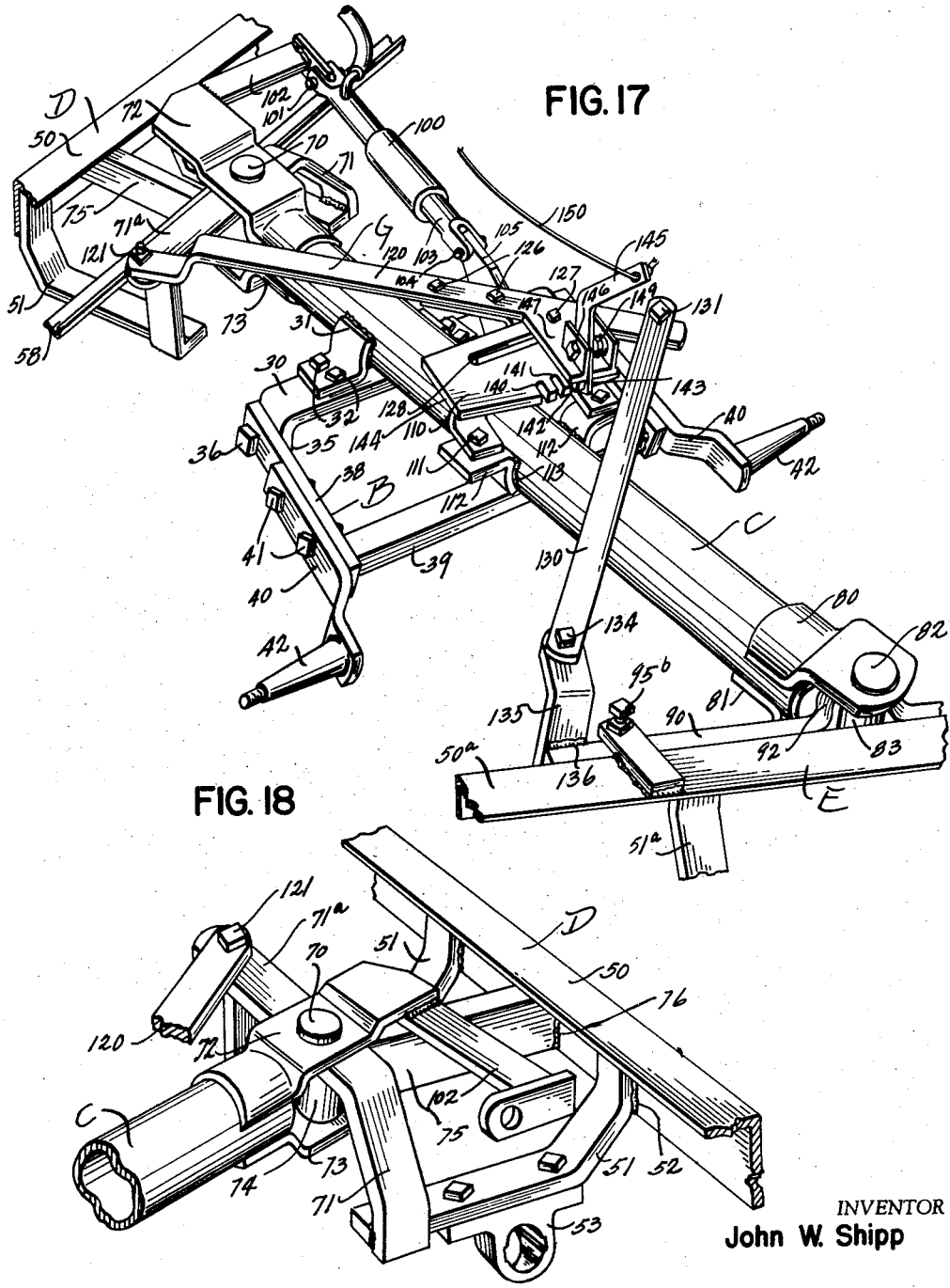

United States Patent Office 2,944,614
Patented July 12, 1960

2,944,614

OFFSET HARROW

John W. Shipp, Athens, Tenn., assignor to Athens Plow Company, Athens, Tenn., a corporation of Tennessee Filed Apr. 14, 1958, Ser. No. 728,249

13 Claims. (Cl. 172—316)

This invention relates to improvements in offset harrows.

The primary object of this invention is the provision of an improved type of offset harrow including a main frame, wheel supporting mechanism therefor, front and rear gangs, a gang angling mechanism and an improved tongue construction; the parts being so associated that plowing may be accomplished with relative ease regardless of the type of soil and moisture conditions encountered; the angling mechanism being under the control of the operator from the tractor seat for varying the cutting angle of the discs at will to suit plowing conditions.

A further object of this invention is the provision of an improved offset type harrow having adjustable means to vary the degree of offset in relation to the tractor used to pull the harrow.

A further object of this invention is the provision of an improved angling mechanism for selectively varying the disc plowing angle without the necessity of the driver leaving the tractor seat.

A further object of this invention is the provision of an offset type harrow embodying a carriage and frame structure supporting a plurality of gangs with means to control the relative angling thereof. An improved tongue and spring arrangement furthermore enables proper spring loading of the gangs for accurate depth cutting in relation to one another.

Other objects and advantages of this invention will be apparent during the course of the following detailed description.

In the accompanying drawings, forming a part of this specification, and wherein similar reference characters designate corresponding parts throughout the several views—

Fig. 7 shows the parts of the harrow with the gangs angled to their greatest extent for maximum plowing angling of the discs.

Fig. 8 shows a detail of the angling mechanism trip lever and associated retaining plate.

Fig. 10 is a side elevation of the harrow, with the discs in earth penetrating position, and more particularly showing the framework of the carriage and draw bar construction connected to a tractor hitch.

Fig. 11 is a fragmentary plan view showing the draw bar or tongue connection to the front gang frame and in section showing certain other details.

Fig. 12 is a cross sectional view showing certain frame connecting details of the rear gang structure, the view being taken substantially on the line 12—12 of Fig. 10.

Fig. 13 is a view, partly in section, showing a side elevation of the details shown in Fig. 11.

Fig. 14 is a fragmentary cross sectional view of the carriage, taken substantially on the line 14—14 of Fig. 15, showing the wheels in full lines for maximum plowing depth and in dotted lines showing the transport wheel position.

Fig. 15 is a plan view of the carriage details shown in Fig. 14.

Fig. 16 is a transverse cross sectional view taken substantially on the lines 16—16 of Fig. 15.

Fig. 17 is a fragmentary perspective view showing the relation of the carriage details and the angling mechanism with respect to the main frame of the plow and the frame portions of the front and rear gangs.

Fig. 18 is a perspective view showing the offset harrow main frame member and its pivot connection with the front gang frame.

Fig. 19 is a diagrammatic view of the offset harrow, showing the gangs in parallelism, certain identifying characters showing the dimensional relation of the gang parts with respect to the pivots of the main frame with various moment and thrust factors.

Figure 1:
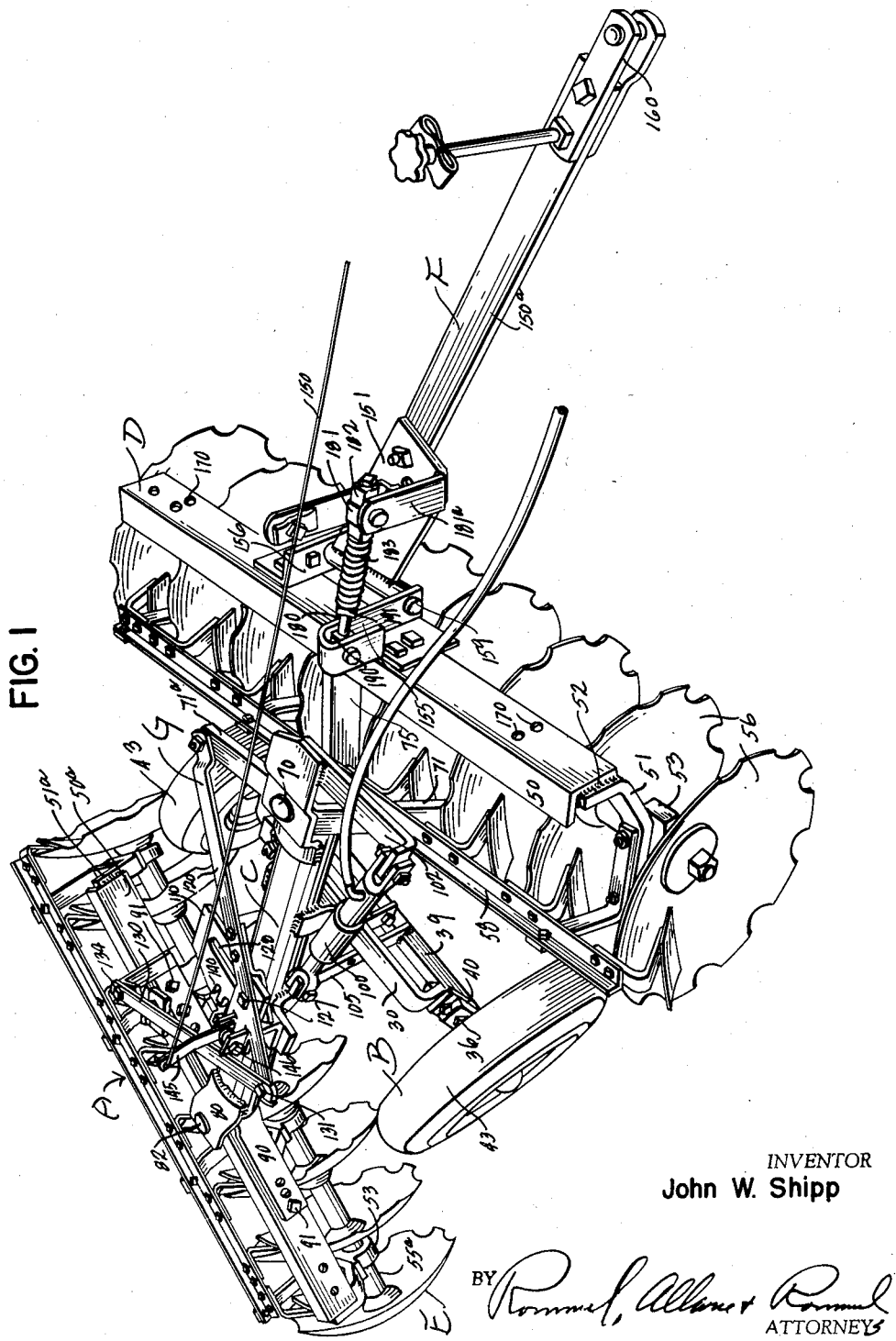
Fig. 1 is a perspective view of the improved offset harrow, with the front and rear gangs in plowing position, out of parallel.
Figure 2:
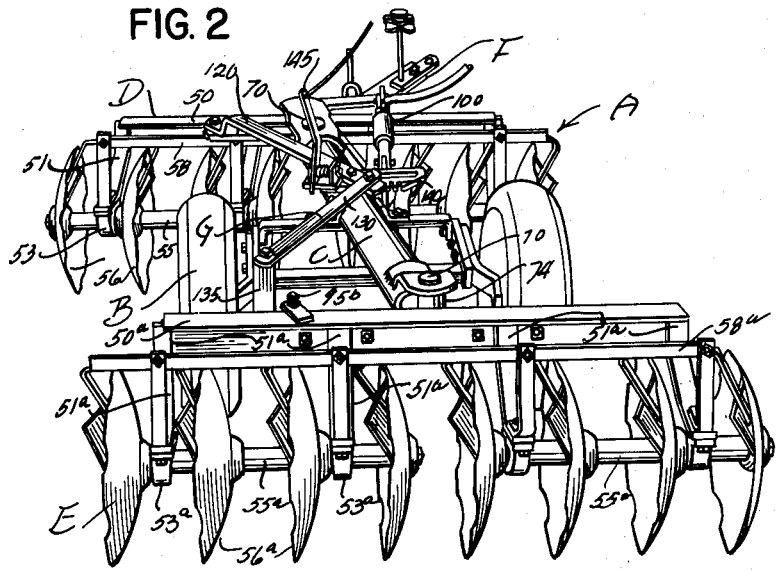
Fig. 2 is a rear perspective elevation of the improved offset harrow, with the gangs parallel.
Figure 3:
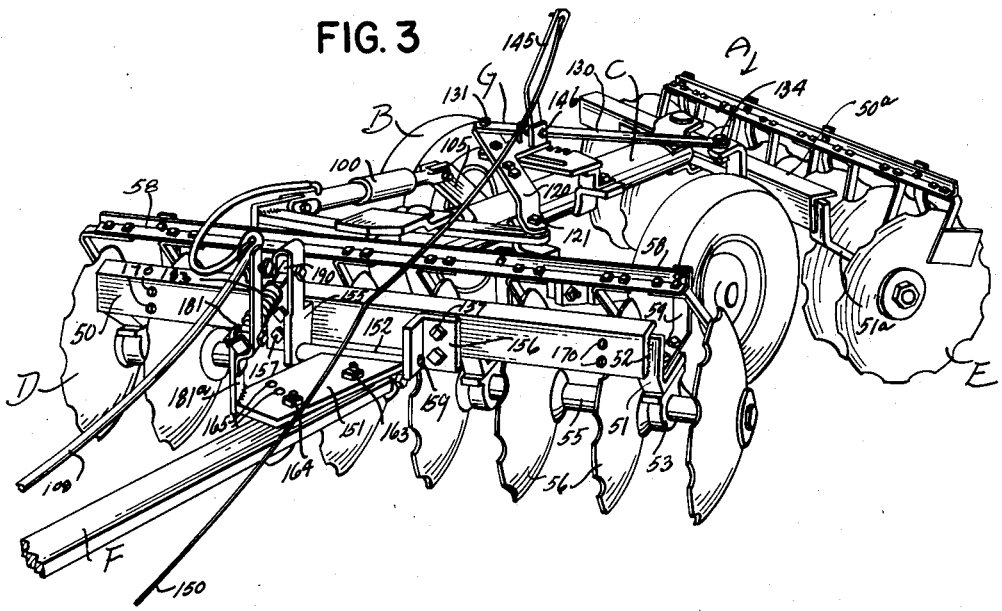
Fig. 3 is a left hand front corner perspective view of the harrow, with the gangs in angled relation and more particularly showing the tongue connection of the front gang frame and the angling mechanism.

In the drawings, wherein for the purpose of illustration is shown only a preferred embodiment of the invention, the letter A may generaly designate the offset harrow or plow. It comprises a carriage B, or running gear adapted to support a main frame C. Front and rear gangs D and E are respectively provided, having operative connection with the main connecting frame C. An improved tongue and spring assemblage F is provided, and gang adjusting or angling mechanism G is also provided to facilitate angling of the gangs and holding of the positions of the same.

Referring to the carriage construction B, the same is adapted to raise and lower the detachable frame member C, as well as the front and rear gangs D and E. To that end it includes an inverted U shaped anchor bar or beam 30, which is rigidly but preferably detachably connected to the main beam C of the plow frame by means of segmental shape bracket pieces 31. The latter are welded to opposite sides of the beam C, and have outwardly extending flanges, supporting bolts 32, by means of which the rigid anchor bar or piece 30 is supported in usually horizontal position. Bar 30 has down turned end flanges 35 (see Fig. 16), which have connected therethrough detachable supporting bolts or pins 36, carrying bushings 37 upon which supporting arms 38 are hung for fore and aft swinging; these arms 38 at their outer ends having welded thereto a heavy cross beam 39. Detachable wheel supporting arms 40 are connected by bolts 41 to the outer sides of each arm 38. Each arm 40 has a wheel supporting spindle 42 adapted to carry a bearing or other structure for supporting a wheel 43. It is thus apparent that the wheels 43 and their spindles can be raised and lowered by swinging upon the axes of the bolts 36, beneath the frame C, for the purpose of lowering the wheels into transport position as is shown in dotted lines in Fig. 14, or collapsed as shown in full lines in Fig. 14, when the gang discs are in maximum depth plowing positions.

Front and rear gangs D and E are composed of disc and cylinder assemblies which may partake of structure well known in the art. Briefly, the front gang structure D, comprises a main beam or frame piece 50 provided with bracket arms 51, which may be welded at 52 to the beam 50 and which are provided with bearing blocks or supporting brackets 53 for supporting the cylinder structure 55 of the discs 56. Each of the front and rear gangs comprises two of these cylinder assemblies. Furthermore, the gangs may each include angle bars 58, connected by suitable arms 59 to the frame of the gang and upon which the usual scrapers for the discs are mounted. Both gang structures D and E have their main beams facing forwardly of the discs. The beam $50^a$ of rear gang structure E is, similar to the frame 50 of the front gang, connected by brackets $51^a$ to the cylinder structure $55^a$ upon which the discs $56^a$ are mounted.

The main connecting frame C preferably consists of an elongated steel tube, which may be hollow if desired. It is connected at its forward end upon a pivot pin or bolt 70 to a bracket arm 71, which in turn is welded to the frame bracket 51 (see Fig. 18) or some part of the main frame 50.

At its front end the tubular main frame C is provided with upper and lower pivot connecting brackets 72 and 73, welded to the tube. They extend forwardly to provide a bifurcated connection for the vertical pivot pin 70. A sleeve 74 is welded to bracket arm 71 and to a brace 75. The latter is welded at 76 to the frame piece 50 of front gang D. The bracket 72 lies over arm 71 and lower bracket 73 under sleeve 74. The pin 70 is disposed in sleeve 74. Beam 71 extends at $71^a$ to the opposite side of the pin 70 and there has another bracket connection at 51 upon the beam 50 of the front gang D, as shown in Fig. 17. It will be noted that the bracket 71 moves with the beam 50 of the front gang and is rigidly connected thereto at all times.

The harrow main beam C at its rear end is provided with upper and lower bracket arms 80 and 81, welded thereto (see Fig. 17). They have rearwardly extending flanges adapted to be pivotally connected to a vertical pivot pin 82. The latter is housed within a sleeve 83. A laterally adjustable supporting strap 90 is bolted at 91 to the front surface of the rear gang beam $50^a$ (see Fig. 1). It has a segmental portion 92 (see Fig. 17) intermediate its ends to receive the pin sleeve 83 in welded relation therein. It will be noted that the strap or bar 90 may be bolted at various locations along the length of the gang beam $50^a$, since both the strap at 95 and the beam $50^a$ at $95^a$ are provided with openings therein to permit of such adjustment. A set screw $95^b$, shown in Fig. 12, may be mounted upon the beam $50^a$ to operate against the strap or pivot support 90; it being shown in Fig. 12, that the openings $95^a$ in the beam $50^a$ are elongated to permit lifting the end of the beam for leveling purposes.

Referring to the means for raising and lowering the main beam C and the disc gangs therewith, a hydraulic cylinder 100 is pivoted at 101 upon a lateral bracket extension 102 secured to and acting as part of the main beam bracket extension 72. The cylinder piston rod 103 extends rearwardly and has a pivot connection at 104 with the forward end of arm 105 welded or otherwise rigidly connected at 106 upon the cross beam 39 of the carriage. Hose 108 may supply fluid to the cylinder. The cylinder may be double acting, but is shown as single acting in the drawings, intended for use mainly in raising the gangs. It is quite obvious that forcing fluid into the cylinder 100 will through the arm connection 105 lower the wheels, due to the fact they have pivot connections upon the pins 36. The cylinder 100 may receive its fluid from the usual takeoff of the tractor H shown in Fig. 10 of the drawings.

Referring to the angling mechanism G, the same is provided for the purpose of holding the gangs D and E in correctly angled and offset relation, and also for the purpose of relatively adjusting the plowing angle of the discs. The same may comprise a fixed supporting plate 110, which is bolted at 111 in straddling relation above the main frame C upon brackets 112 welded at 113 to each side of the main beam C (see Fig. 17).

Figure 9:
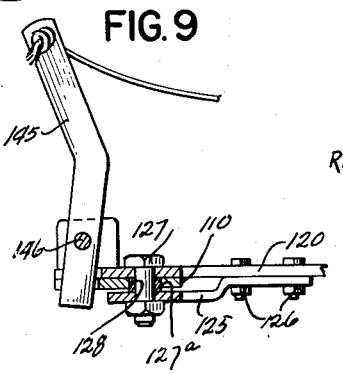
Fig. 9 is a view showing a detail of the angling trip lever mechanism, taken substantially on the line 9—9 of Fig. 6.

The angling mechanism G has a front strap 120, which at its fore end is pivotally connected at 121 to the bracket piece $71^a$, at one side of the main beam C. This strap 120 extends across the beam C and overlies the plate 110. The strap 120 has a stabilizing piece 125 (see Fig. 9), bolted thereto at 126. The strap 120 and this piece 125 support a bolt 127, which has a roller $127^a$ thereon adapted to roll and move along a slot 128 provided across the fixed plate 110, as shown in Figs. 9 and 17 of the drawings. A rear strap 130 is pivoted at 131 to the rear end of the front strap 120, at the right hand side of the beam C and extends in acute angled relation across the top of the beam C to the left side of the same; its rear end being pivotally connected at 134 to a bracket 135, which is welded or otherwise secured at 136 to the supporting strap 90 (see Fig. 17).

Figure 4:
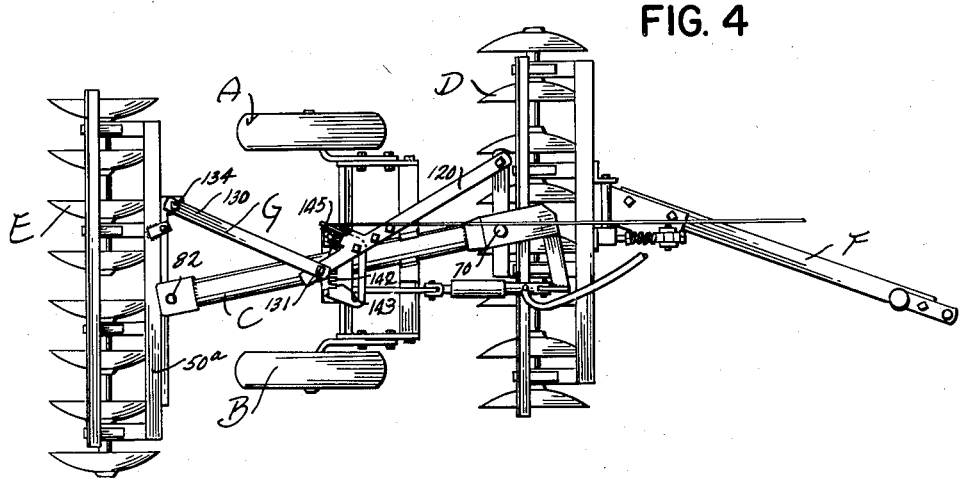
Fig. 4 is a plan view of the harrow with the gang discs in axial parallelism.
Figure 5:
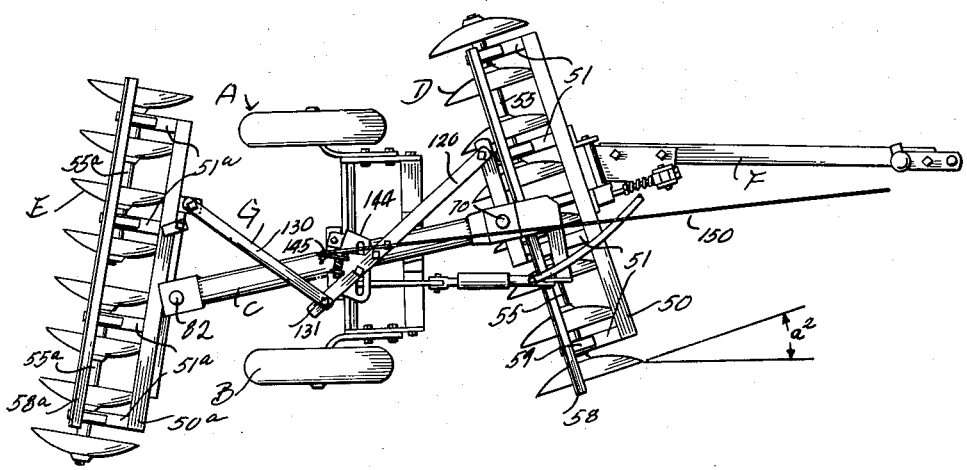
Fig. 5 is a plan view of the details of the harrow shown in Fig. 4, but with the gangs angled for a minimum plowing angle of the discs.
Figure 6:
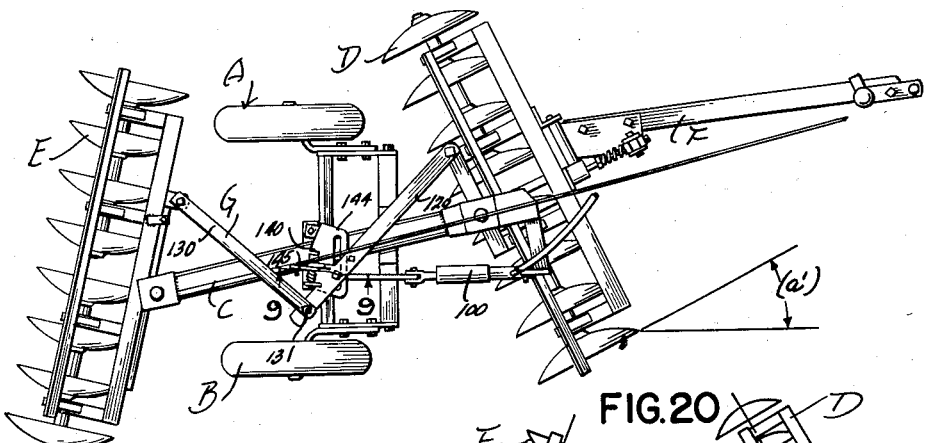
Fig. 6 is a view of the parts similar to that shown in Fig. 5, but with the gangs further angled to a deeper degree, for positioning the plowing discs at a greater plowing angle.

It is a purpose of the angling mechanism to permit the driver to control the exact angle of the discs and to change that angle with ease, and without dismounting from the tractor seat. The fixed plate 110 is provided with four notches 140, 141, 142 and 143 therein, into which an end of the latch lever 145 may enter. This lever 145 is pivoted at 146 upon suitable bracket plates located upon the extension 147 of the front strap 120; a spring 149 being employed to stabilize the position of the latch lever 145 and normally urge its end into and toward the notches. The lever 145 may have a trip rope 150 extending forwardly to the tractor seat, as shown in Fig. 10, of the drawings. The manner of shifting the lever to the various notches will be subsequently described, but it should be noted that when the trip lever 145 is in the notch 143, as is shown in Fig. 17, the gangs will have the discs in position for their greatest plowing angle, designated by the angle $a$ shown in Fig. 7; when the trip lever is in the notch 142, the discs will have a smaller plowing angle $a^1$ as shown in Fig. 6, and when the trip lever is in the notch 141 the pitch of the blades will even be smaller. The trip lever when in the notch 140 positions the blades at their smallest plowing angle $a^2$, as shown in Fig. 5, of the drawings. When the gangs are in parallel and out of plowing position, as shown in Fig. 4, the trip lever is actuated to enable it to swing to the extreme outer edge of the plate 110 where the same will engage the edge 144 for holding the gangs in parallel. It should be noted from Fig. 19, that when the gangs are paralleled and in a transport position, the axis of the main beam C will be disposed at an acute angle $b$, which experiment has found to approximate eleven degrees, although that limitation is not to be imposed upon the invention herein described. It is furthermore to be noted that the front pivot 70 is located upon the front gang structure D a greater distance to the right of the midway point of the front gang than to the left; thus the distance L designated in Fig. 19, is greater than the distance $l$. It is furthermore to be noted that the axis of the pivot 70 is located to the rear of the center line of the front gang cylinder assemblage.

For the rear gang assemblage E the concaved or plowing sides of the discs face left in counter distinction to right facing for the discs of the gang D, but here again the main beam pivot 82 is located farther to the right of the gang assemblage E than to the left of the midway point of the gang, and the distance L shown in Fig. 19, for the gang E is of greater length than the distance $l$.

As the tractor draws the plow, there will be greater thrust designated by the letter T when the gang E is angled for producing a greater moment M to the left of the plow gangs than for the right hand side of the gang where the thrust and the moment are respectively designated at t and m.

Referring to the draw bar or tongue structure F, the details are best shown in Figs. 1, 3, 11 and 13. The tongue bar 150ª has bolted thereto a plate 151 at its rear end. The plate 151 has a pivot pin receiving sleeve 152 welded at 153 thereto the axis of which is substantially horizontal. The pin 159 disposed in sleeve 152 is supported by brackets 155 and 156 bolted at 157 to the beam 50. This holds sleeve 152 and the pivot pin 159 therein parallel with the front gang beam 50. Thus, it will be noted that the tongue extends forwardly and to the right, at an acute angle to the beam 50. At its front end it is provided with suitable means 160 for pivotal connection to the tractor hitch 161, in manner well known in the art.

The bar 150ª is connected to the plate 151 on a pivot bolt 163. It has another bolt 164, which may be connected in any of a plurality of openings 165 provided in the plate 151, by means of which the angle of the draw bar with respect to the line of travel of the tractor may be changed slightly. It will also be noted that other openings 170 (Fig. 3) may be provided in the front gang beam 50 in order that the draw bar may be shifted to the extreme ends of the frame of the front gang, or to an immediate position, if such is desired.

A spring assemblage is provided in connection with the draw bar to adjust the leveling of the gangs. This consists of a bolt 180, which has a slidable extension through a pivoted bolt guide 181; bushings 182 and a compression spring 183. The bolt 180 threads into a pivoted nut 190. A nut 191 is threaded upon the bolt 180 to regulate anchor compression of the spring 183. Releasing of compression of the spring through adjusting the nut C will permit lowering of the front section or gang of the harrow. Increasing the spring pressure will enable the front gang or harrow to raise. Thus the harrow can be properly leveled, front to rear. The pivoted anchor sleeve 181 allows some spring action, that is some flexibility when traveling on uneven terrain. Compression spring 183 compels the rear gang to cut deeper than without the spring pressure. This in turn determines the position the rear section will trail the front section. Since the rear section is more heavily loaded it will cut deeper and tend to swing more to the right behind the tractor. Now as spring pressure is released the opposite will be true.

Those skilled in the art know the importance of change of plowing angle of the disks, from maximum angling setting to seed bed setting where minimum angle setting is desirable. Any of the angling positions shown may be needed for the best possible work. In various sections of the country different types of soil are encountered, with different moisture conditions. It is necessary for an operator frequently in plowing the same field to change the angle setting because of differing moisture variations. It is more economical to use the least disc position desirable with efficiency.

In order to accomplish the angling the operator pulls the latch string 150 to free the latch. He will then back the tractor until the tool assumes the angle he desires and then release the latch rope. The latch will lock in position. If less angle is wanted the operator pulls the latch or trip rope and pulls the harrow forward to the desired angle and then releases the latch rope. All angling changes are made with the implement in ground plowing position.

Figure 20:
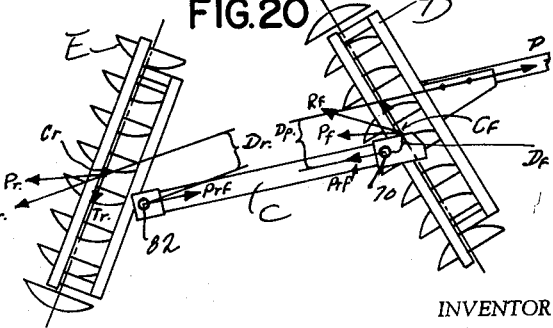
Fig. 20 is a diagrammatic view of the offset harrow, with the gangs in angled plowing positions, showing horizontal forces acting on the various parts of the harrow.

The extent to which the pivots of the front and rear gangs are offset intermediate the ends of the cylinders and also offset to rear and front with respect to the center line of the respective cylinders may vary. The thrust forces have been indicated in the diagrammatic view in Fig. 20.

Referring to the front gang section D the summation of the soil reaction will generally be located at about $C_f$ and in the direction $R_f$. With respect to the rear gang E the action will be near $C_r$ and in the approximate direction $R_r$. The line of pull of the tractor is indicated at P. The pivots are designated at 70 and 82. When the harrow is pulled forward and the movements of the gangs about their respective pivots is not restricted the rear section will pivot counter clockwise and the front section will pivot clockwise. This will tend to deangle the harrow. Backing the harrow essentially reverses these forces and causes the harrow to go into angle. The moment tending to pivot the rear gang section is $D_r \times R_r$. Assuming that we have chosen $C_r$ and $R_r$ correctly, then the distance $D_r$ can be easily computed. The moment tending to rotate the front is $(P \times D_p) - (R_f \times D_f)$. P must be equal to $P_r + P_f$. It will be greater than $R_f$ and likewise $D_p$ is greater than $D_f$. Therefore, the overall forces on the front section tend to rotate it clockwise when the harrow is pulled forward. This together with the latch to restrict and control these movements is the very essence of the invention.

It should be remembered that the axis of the running wheels of the carriage of the harrow usually parallels the tractor rear axle. It should also be remembered in considering the structure of this invention that the plowing of a field is usually done by clockwise travel, particularly with an offset harrow, and therefore the left tractor wheel usually follows in the furrow on the next pass created by the offset right hand disc of the rear gang made on the previous pass.

Referring to Fig. 14, the strap 45 pivoted at 48 on bracket 44 has an end opening 46 to receive a bolt 47 when the wheels are to be locked in transport position. An adjusting bolt 50ᵇ supported upon a bracket 49ª welded to the frame C may be used to clamp against the bar 39. The wheels of the casing are each disposed appreciably inward of the outer plowing disc ends of the gangs, and the connecting rod 105 and hydraulic cylinder are both located to one side of the main frame beam C.

Various changes in the shape, size, and arrangement of parts may be made to the form of invention herein shown and described, without departing from the spirit of the invention or scope of the claims.

I claim:

1. In a tractor driven type offset disc harrow the combination of front and rear gangs, a main beam connecting said gangs together for angled adjustment thereof, a cross beam connected to said main beam and extending to each side of said main beam, wheels, lever means rotatably supporting said wheels on aligning axes upon said cross beam at each side of the main frame, hydraulic mechanism upon the main beam including a piston rod, and a rod connecting said lever means with the piston rod to move said lever means for elevating and lowering the said wheels, said connecting rod and hydraulic mechanism being located entirely to one side of the gang mounting beam of said harrow.

2. In a tractor driven type offset carriage the combination of front and rear gang sections having a connecting frame therebetween, running gear connected to the frame between said gangs having means to elevate and lower the same, a tongue pivotally connected upon a horizontal axis to the front gang for vertical movement, a bolt pivotally mounted upon said front gang adjacent the pivot connection of the tongue upon said frame, means connecting the fore end of said bolt with the tongue spaced from the aforesaid connection of the bolt with said gang, a compression spring upon said bolt operating against the said fore end connecting means, a nut upon said bolt for compressing said spring and relieving the compression thereon.

3. A harrow as described in claim 2, in which the axis of pivot of the tongue upon said gang parallels the run of said front gang and in which means is provided for adjustment of the tongue on the gang at different positions along the length of said gang, and means for adjusting the angular position of the tongue with respect to the pivot axis of the tongue upon said gang.

4. In a tractor driven type of offset disc harrow the combination of front and rear disc gangs, an elongated main frame beam between said gangs forwardly pivoted intermediate the ends of the front gang and rearwardly pivoted intermediate the ends of the rear gang, angling means to hold the relative angled or paralled positioning of said gangs with respect to each other comprising an elongated rod pivotally connected to the front gang with its pivot location at one side of the axis of the main frame and extending across the main frame to the opposite sides of the axis of the main frame, an angling rod pivotally connected to the rear gang and at the same side of the axis of the main connecting frame as the connection of the first mentioned angling rod to the front gang and extending transversely across the main frame and its opposite end being pivotally connected to the rear most end of the first mentioned angling rod, and means for latching the adjusted angled relation of said angling rods to said main frame to hold the gangs in various angled or paralled relationship.

5. An offset harrow as described in claim 4, in which the last mentioned means comprises a trip lever pivotally mounted upon one of said angling rods, the main frame having means thereon to lock a portion of said trip rod in a variety of positions thereon to prevent angling of the gangs, said trip lever having spring means normally urging the same to a locking relationship with the last mentioned locking means, and a trip line extending from said trip rod for operation by the driver of a tractor pulling the harrow.

6. Angling mechanism for holding the relative positions of front and rear gang sections of harrows comprising an attaching plate having a row of notches along an edge thereof, an angling bar connected to said plate for slidable movement thereon in the line of said row of notches, a second angling bar pivotally connected to an end of said first mentioned angling bar, a trip lever pivotally mounted upon said plate, spring means normally urging the trip lever to engage a selected notch in said plate, said angling bars at their free ends opposite the relative connection thereof having means for pivotal connection with front and rear gangs of a harrow.

7. In a tractor driven type of offset disc harrow, the combination of front and rear gangs, each including a frame and axially aligned discs connected to said frame, a main frame beam, means pivotally connecting the main frame beam at its forward end on a vertical pivot to the frame of the front gang rearwardly of the axial line of the front gang discs, means pivotally connecting the rear end of said beam to the frame of the rear gang forwardly of the axial line of the discs of the rear gang, the pivotal connections of said beam with said gangs being such that the plowing thrust of each gang is different at each side of the pivotal connection with the main beam and the major plowing thrusts of both gangs lie at the same side of the beam, and angling holding means connected to the frames of said gangs and to the main beam for holding the gangs in parallelism and in varying angular relations.

8. In a tractor driven type of offset disc harrow, the combination of front and rear gangs each including their respective frames and series of plowing discs, a main frame beam pivotally connected at its front end to the front gang frame and at its rear end to the rear gang frame on vertical axes, an angling mechanism comprising a front rod pivotally connected to the front gang frame at the front end of said rod the pivot connection of the rod with said front gang frame being spaced laterally from the pivot connection of the main beam with the front gang frame, said angling mechanism including a second rod pivotally connected at its rear end to the frame of the rear gang laterally of the pivot connection of the beam at its rear end upon the frame of the rear gang, said angling rods at their adjacent ends between the gangs being pivotally connected together, and means carried by said main beam intermediate its ends for adjustably connecting and holding said rods in a desired angled relation for the purpose of holding said gangs in parallel and in relatively adjusted angled relation.

9. A harrow as described in claim 8 in which the last mentioned means comprises a notched plate rigidly connected to said beam having a series of notches transversely of the beam, the forward angling rod spaced from but adjacent to the pivotal connection of the two angling rods having a slidable connection upon said plate for transverse sliding, and latching means movably carried by the foremost angling rod operable fore and aft for selective engagement in the notches of said plate.

10. A harrow as described in claim 7 in which the beam when the gangs are in parallel lies out of right angled relation with respect to the axes of the gang discs and when the gangs are in parallel the end of one gang will project laterally farther to one side of the harrow than the other gang and the said other gang at the opposite side of the harrow will project laterally farther than the first mentioned gang.

11. A harrow as described in claim 7 in which a running gear is connected to the main frame having means under the control of the tractor operator for raising and lowering the harrow.

12. In a tractor driven type of offset disc harrow, the combination of elongated disc supporting gangs each rigid throughout the length thereof and each providing a plurality of discs thereon with the discs of one gang reversely positioned with respect to the discs of the other gang, an elongated main beam member, means pivotally connecting said main beam member at its ends to said gangs with one of the gangs pivoted at the forward end of said member and the other gang pivoted at the rear end of said member, said pivot locations being disposed intermediate the ends of said gangs, with each of said gangs having discs arranged with more effective plowing thrust to one side of the pivot than other side thereof, both of said gangs having the discs arranged so there is plowing thrust at each side of the pivot location of each gang but with the greatest plowing thrust for each gang disposed at the same side of the harrow, the pivot of the front gang being disposed at a location rearwardly of the longitudinal axis of the front gang and the pivot of the rear gang being located forwardly of the longitudinal axis of the rear gang, angling means mounted upon said main beam member and connected to the front and rear gangs for complementary similar angling of said gangs, and means controlled by an operator on the tractor which is pulling the harrow for operating said angling means.

13. In a tractor driven type of offset disc harrow, the combination of front and rear elongated disc gangs, an elongated main beam having a pivotal connection at its forward end intermediate the ends of the front gang and a pivotal connection at its rear end with the rear gang intermediate the ends of the latter, the pivot axes of said pivotal connections being vertical whereby the gangs may horizontally angle with respect to each other, a carriage including a cross frame connected to the main beam intermediate the ends of the latter, wheels rotatably connected on aligning axes by a leverage mechanism to said cross frame for disposition of a wheel at each side of the main beam, said wheels being located appreciably inwardly of the extreme outer effective plowing ends of said gangs, means for raising and lowering said leverage mechanism and the wheels, angling means movably connected upon said main beam and movably connected to the front and rear gangs for moving said gangs into a desired angled or paralleled relationship, and means connected to the beam for locking the angling mechanism with the gangs in the desired angled or paralleled relationship.

(References on following page)

References Cited in the file of this patent
UNITED STATES PATENTS

| | | |
|---|---|---|
| 1,824,011 | Enzenauer | Sept. 22, 1931 |
| 1,852,206 | Hamilton | Apr. 5, 1932 |
| 1,893,641 | Boda | Jan. 10, 1933 |
| 1,924,416 | Rose | Aug. 29, 1933 |
| 2,169,471 | Mitchell | Aug. 15, 1939 |
| 2,196,485 | White | Apr. 9, 1940 |
| 2,201,240 | Mitchell | May 21, 1940 |
| 2,607,177 | Rose | Aug. 19, 1952 |
| 2,608,813 | Frank | Sept. 2, 1952 |
| 2,633,686 | Domries | Apr. 7, 1953 |
| 2,857,724 | Kenney et al. | Oct. 28, 1958 |